United States Patent
Calnon

(10) Patent No.: US 6,241,186 B1
(45) Date of Patent: Jun. 5, 2001

(54) COMBINATION LUGGAGE RACK AND AIR DISTRIBUTION DUCT

(75) Inventor: Terry Calnon, Shropshire (GB)

(73) Assignee: Transmatic Europe Limited, Shropshire (GB)

( * ) Notice: Subject to any disclaimer, the term of this patent is extended or adjusted under 35 U.S.C. 154(b) by 0 days.

(21) Appl. No.: 09/319,343

(22) PCT Filed: Oct. 8, 1998

(86) PCT No.: PCT/GB98/03026

§ 371 Date: Jun. 4, 1999

§ 102(e) Date: Jun. 4, 1999

(87) PCT Pub. No.: WO99/17958

PCT Pub. Date: Apr. 15, 1999

(30) Foreign Application Priority Data

Oct. 8, 1997 (GB) .................................................. 9721360

(51) Int. Cl.⁷ ............................. B64D 11/00; B64D 13/00
(52) U.S. Cl. ........................................ 244/118.5; 296/208
(58) Field of Search ............................. 244/118.1, 118.5, 244/118.6; 296/208; 105/329.1, 397

(56) References Cited

U.S. PATENT DOCUMENTS

| | | |
|---|---|---|
| 3,355,210 | 11/1967 | Cripe . |
| 5,174,484 * | 12/1992 | Bott ...................................... 224/321 |
| 5,388,744 * | 2/1995 | Glorio et al. ......................... 224/324 |
| 5,441,326 * | 8/1995 | Mikalonis ............................. 296/208 |
| 5,442,794 * | 8/1995 | Drake .................................... 362/73 |
| 5,518,448 | 5/1996 | Madoglio et al. .................... 454/108 |

FOREIGN PATENT DOCUMENTS

| | | |
|---|---|---|
| 3729050 | 3/1989 | (DE) . |
| 41 28 234 C1 * | 1/1993 | (DE) . |
| 4431245 | 1/1996 | (DE) . |
| 9518727 | 7/1995 | (WO) . |

* cited by examiner

Primary Examiner—Charles T. Jordan
Assistant Examiner—Christian M. Best
(74) Attorney, Agent, or Firm—Volpe and Koenig, P.C.

(57) ABSTRACT

A modular rack unit for use in a vehicle such as a coach consisting of an outer shell (2) and an inner shell (9). The inner shell (9) acts as a shelf for luggage and defines with the outer shell (2) an air conduit (5). The rack unit is secured to the vehicle by means of pillars (14) and two longitudinally extending brackets (18, 19). Each bracket defines with the engaging edges of the outer and inner shells respectively labyrinthine passages for the escape of any air from the air conduit (5).

11 Claims, 3 Drawing Sheets

COMBINATION LUGGAGE RACK AND AIR DISTRIBUTION DUCT

The present invention relates to a rack unit and in particular a rack unit suitable for use on public transport vehicles such as coaches, trains and aeroplanes that may be used for luggage storage as well as ducting for lighting and air-conditioning.

Within the passenger compartments of public transport vehicles storage space is essential but it is often in conflict with the space required for passengers' comfort within the compartment. Therefore, storage racks are usually provided along the walls of the passenger compartment above passenger height, when seated, where luggage can be stored. The racks are also used to provide ducting for lighting and air-conditioning.

In the case of coaches, traditionally, storage racks have been made by securing plywood boards to the inner walls of the coach. Pillars are then secured to the ceiling of the coach to hold the plywood in position as a shelf. Air-conditioning ducts are separately constructed around the plywood board as are lighting ducts and other accessories such as hand-rails. In order for the air-conditioning to work efficiently it is important that the air-conditioning ducts are air-tight. This has presented a problem in the past as a dividing wall extending between the plywood board and the ceiling of the compartment must be secured to define the wall of the air duct. However, it has been found to be difficult to ensure that the points of contact between the plywood board, the dividing wall and the ceiling are air-tight. Furthermore, the rack is quite heavy and needs to be held when being secured to the walls and ceiling of the compartment. Therefore, during construction it is usual for two people to be needed in the constructing and fitting of each rack unit.

The present invention seeks to address the problems with conventional rack units and seeks to provide an improved rack unit that is easier to fit and ensures a more reliable seal for the air-conditioning ducts.

The present invention provides a rack unit for use in a passenger compartment comprising an outer shell; an inner shell connected to the outer shell and providing a shelf surface; one or more pillars for supporting the inner and outer shells; a duct support defining a longitudinally extending inwardly directed slot; and a longitudinally extending bracket spaced apart from the duct support, whereby the inner and outer shells describe a longitudinally extending air channel that is sealed by means of engagement between an edge of the inner shell and the duct support and engagement between an edge of the outer shell and the bracket.

The rack unit is modular in construction and is preferably made from a plastics material. In use, a plurality of rack units is fitted to the interior of a passenger compartment in a continuous series. Ideally, the engagement of the inner shell with the duct support and the engagement of the outer shell with the bracket define labyrinthine passages for the escape of any air from the longitudinally extending air channel. Moreover, at least one of the engaging surfaces of the inner shell and the duct support and at least one of the engaging surfaces of the outer shell and the bracket may additionally include a sealing material such as a rubberised compound for providing additional sealing against escape of air from the air channel.

An embodiment of the present invention will now be described by way of example with reference to the accompanying drawings, in which.

The rack unit 1 is modular in construction and is preferably formed from a plastics material such as an ABS or polycarbonate based material that is fire retardant and decorative. The rack unit is preferably constructed in 6 ft (1829 mm) lengths and is sufficiently light in weight (approximately half the weight of conventional rack units) that one person is easily able to handle and fit the rack on their own.

Figure 1:
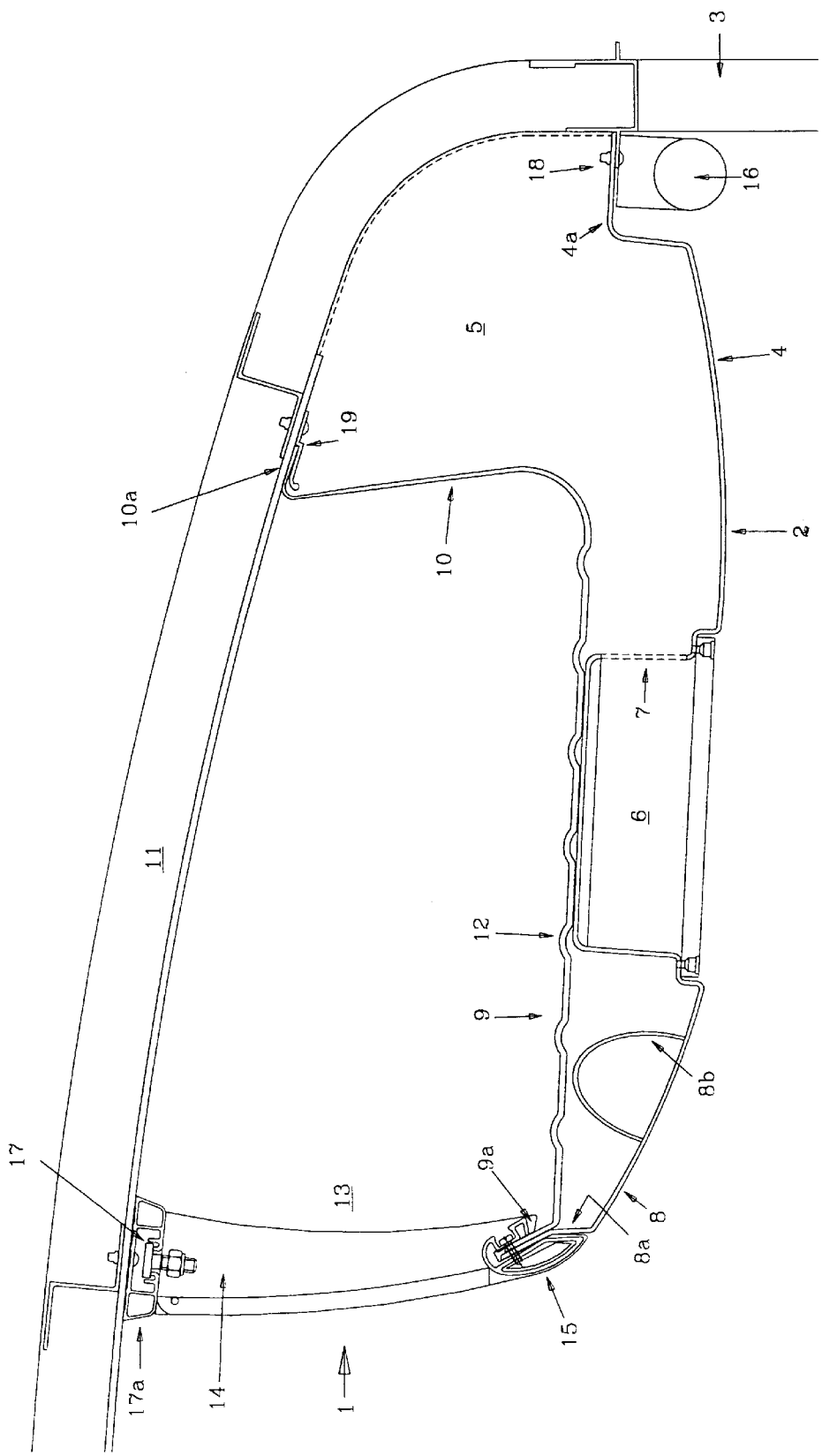
FIG. 1 is a sectional drawing of a rack unit in accordance with the present invention.

The rack unit has an outer shell 2 that is intended to project inwardly from a wall of a passenger compartment 3. A first part 4 of the outer shell describes a first wall of an air-duct channel 5. The outer shell 2 also includes and is integral with an air-outlet compartment 6 that is in the form of a downwardly opening, elongate rectangular channel. A side wall 7 of the air-outlet compartment 6, nearest the first part 4 of the outer shell, is perforated to permit ingress of air from the air-duct channel 5. A second part 8 of the outer shell, that extends inwardly from the air-outlet compartment 6, defines the outer wall of a lighting duct. The second part 8 may include apertures or slots, not shown, through which light passes. Alternatively, the second part 8 may be wholly or partly transparent or translucent. As seen in FIG. 1, the second part 8 of the outer shell includes an elliptically shaped channel 8b that forms a lamp housing. The surface of the channel 8b is light reflective and the channel is closed by means of a lens.

The rack unit 1 further includes an inner shell that provides a storage shelf 9. The storage shelf 9 is secured to the inner edge 8a of the outer shell 2 and extends outwardly, towards the wall 3 of the passenger compartment. Integral with the storage shelf 9 is a second wall 10 that defines jointly with the first wall 4 and the compartment wall 3 the air-duct channel 5. The second wall 10 curves from the storage shelf 9 upwardly to extend and connect with the ceiling 11 of the passenger compartment. The second wall 10 may include one or more doors (not shown) to permit access to the air-conditioning channel 5 and/or any blowers.

The storage shelf 9 includes longitudinally extending grooves 12 that provide strengthening of the shelf and also limit movement of articles placed on the shelf towards the access opening 13 to the shelf 9. The grooves 12 terminate short of the side edge of the storage shelf 9. One of the side edges of the shelf includes an upwardly directed lip or barrier (not shown) of preferably approximately 3 inches (75 mm) in height. The lip acts to prevent movement of luggage sideways beyond the edge of the shelf 9. The access opening 13 is defined by the inner edges 8a, 9a of the outer shell 2 and the storage shelf and by the ceiling 11 of the passenger compartment. Pillars 14 extending between the storage shelf 9 and the ceiling 11 of the passenger compartment additionally define the access opening 13 and provide support to the storage shelf 9. The pillars 14 are provided, for example, every 3 ft (914.5 mm) and ideally the pillars are provided at each end of the rack unit with a further pillar positioned approximately centrally. Furthermore, the pillars at each end of the rack unit may be arranged to overlap with the ends of adjacent rack units thereby reducing the overall number of pillars employed and the space taken up by the pillars. To provide additional strengthening, the storage shelf 9 can be bonded to the air-outlet compartment 6 on which it rests. One or more doors (not shown) may be provided to close the access openings 13.

Along the inner edges 8a, 9a of the outer shell 2 and the storage shelf a cover 15 is provided to protect the edges 8a and 9a and to provide a convenient hand-rail, where necessary, for passengers in the compartment. The cover 15 may slide or clip over the exposed edges 8a and 9a and may be secured by a concealed bolt or other non-projecting securement means. Although not shown, the pillars 14 are connected at their lower ends not only to the edges 8a, 9a of the outer shell and storage shelf but also to the hand rail 15. This ensures that any load applied to the hand-rail 15 is spread to the pillar fixtures instead of relying solely on the fixings between the pillars 14. One way of securing the pillars to the hand-rail employs a tapered looking member which locks into apertures in the pillars 14 and the hand-rail 15. The locking member additionally ensures alignment of the parts of the rack unit.

At the outer edge 4a of the first part of the outer shell 2, adjacent the compartment wall 3, a roller blind 16 or other curtain rail is provided to enable passengers to cover any windows, not shown, provided in the compartment wall 3. The roller blind 16 is located in a recess and is an optional feature.

The pillars are secured to the ceiling 11 of the passenger compartment by means of a captive bolt 17 or any other suitable securement means. The captive bolt 17 is located in a continuous slot 17a so that the bolts are free to slid into position above the pillars 14 but are prevented from turning and sideways movement. The outer edge portion 4a of the first part of the outer shell is secured to the compartment wall 3 by means of a longitudinally extending angle bracket 18. The angle bracket 18 may be provided with a rubber seal or other suitable sealing material on its upwardly facing, engaging surface to ensure an air-tight seal between the angle bracket 18 and the outer edge portion 4a of the outer shell. The engagement of the outer edge portion 4a with the bracket 18 provides a labyrinthine passage for the escape of any air from the air-conditioning channel 5.

Additionally, at the upper edge of the second wall 10 a longitudinally extending outwardly projecting flange 10a is provided. The flange 10a is arranged to be located within an inwardly directed longitudinally extending slot, distant from the bracket 18, defined by a duct support 19 with respect to the compartment ceiling 11. The duct support 19 may also be provided with a rubber seal or other suitable sealing material on at least one of the inner surfaces of the slot whereby the flange 10a forms as air-tight seal within the slot when in place. As the slot is open towards the centre of the compartment, i.e. away from the air-conditioning channel, the engagement of the flange 10a in the slot defines a labyrinthine passage for the escape of any air from the air-conditioning channel 5.

Figure 2:
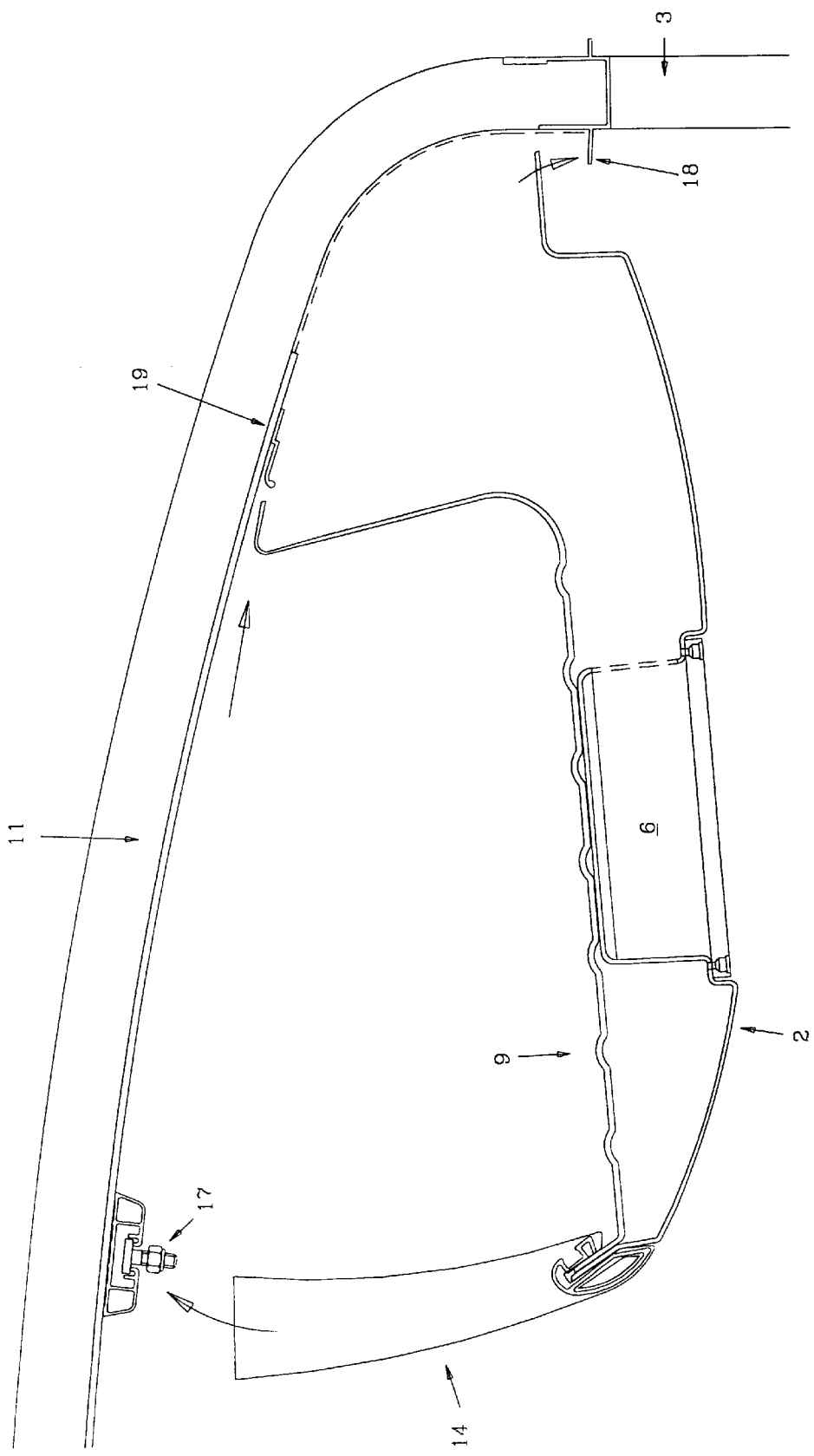
FIG. 2 is a diagram of a rack unit in accordance with the present invention being fitted.

When fitting the rack unit to a passenger compartment, the longitudinal angle bracket 18 and the duct support 19 are initially secured to the compartment wall 3 and ceiling 11 respectively. Captive bolts 17 are also located in the slot 17a at predetermined intervals along the length of the ceiling 11. The rack unit I is then fitted, as shown in FIG. 2, by positioning the outer edge portion 4a of the outer shell on top of the engaging surface of the angle bracket 18. The rack unit 1 is then tipped upwards so that the flange 10a of the second wall is aligned with the duct support 19. The captive bolts 17 are loosely secured to their respective pillars 14 and once the flange 10a is aligned with the duct support 19, the flange 10a is pushed into the slot to form an airtight seal. The captive bolts 17 are then tightened. Finally, the edge portion 4a of the outer shell is secured to the angle bracket 18 using any suitable securement means. The screws used to secure the roller blind may be used to additionally secure the outer shell 2 to the angle bracket 18. Accessories such as individual air-conditioning outlets, lighting units and the light switches preferably are all fitted prior to the rack unit 1 being fitted in the passenger compartment.

A plurality of rack units are usually secured sequentially in a continuous line along the wall of the passenger compartment. To ensure an effective air seal at the junction between two rack units, one side edge of each rack unit includes an offset flange for overlying the side edge of an adjacent rack unit. At least one of the abutting surfaces of the rack edges may include a gasket strip to ensure an air-tight seal. Similarly, one side edge of the storage shelf 9 is arranged so as to be located partly under the upwardly directed lip of an adjacent rack unit. In this way the fitting of a series of modular rack units results in continuous conduits for air-conditioning and lighting etc. as well as continuous shelving surfaces having barriers at intervals to restrict sideways movement of luggage.

In the event the rack units do not extend the entire length of the vehicle, end caps are secured at the exposed side edges of the rack unit in a manner similar to that employed for attachment of a further rack unit.

Figure 3:
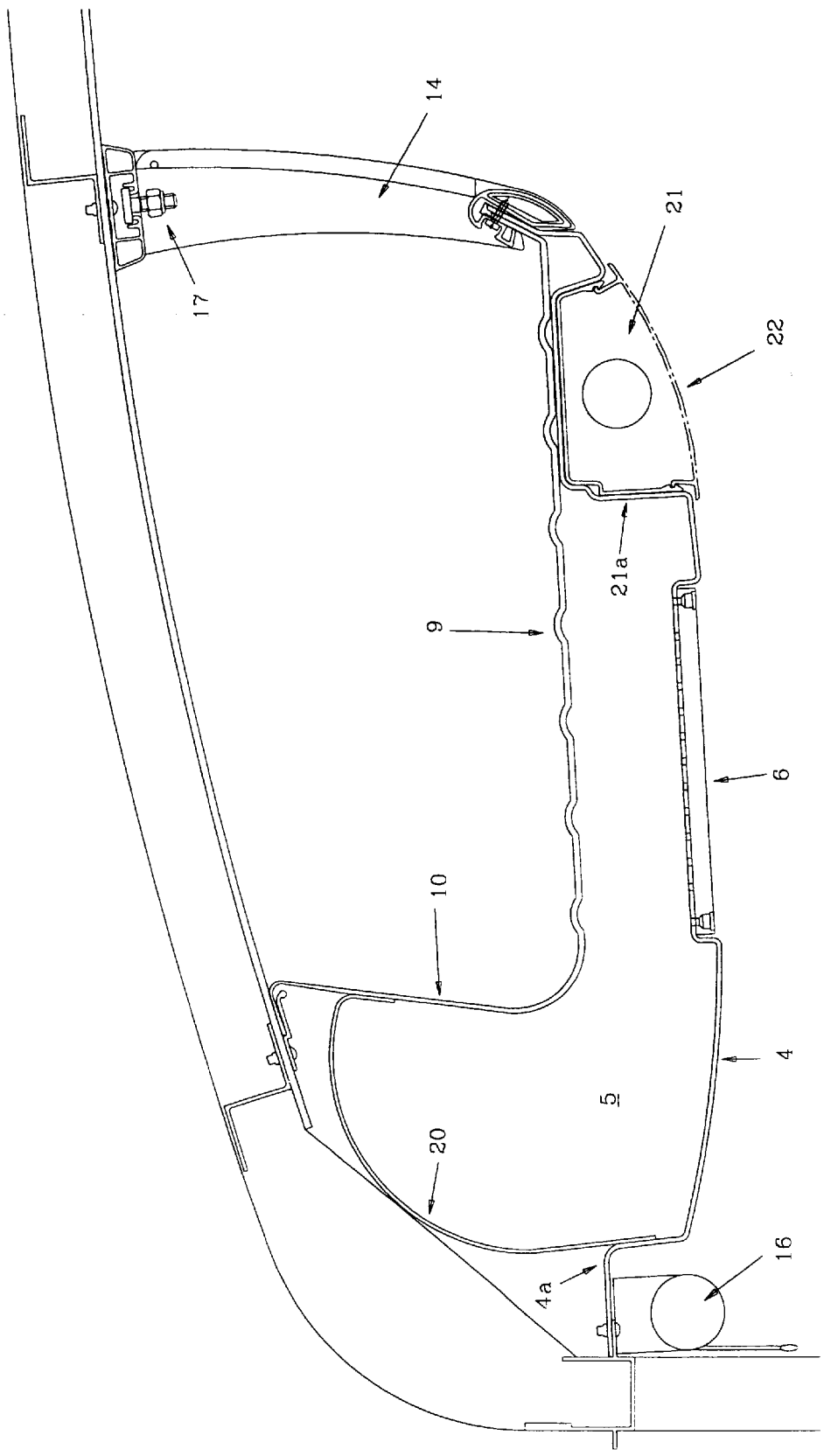
FIG. 3 is a sectional drawing of an alternative rack unit in accordance with the present invention.

FIG. 3 shows an alternative rack unit that may be employed where internal struts or other structure of the vehicle would otherwise obstruct the flow air in the air channel 5. In many respects the rack unit is identical to that shown in FIG. 1 and like reference numerals have been employed, where appropriate. It can be seen in FIG. 3 that an additional air duct wall 20 is bonded to the second wall 10 and the outer edge 4a of the first wall to form air tight seals. The air channel 5 is therefore wholly enclosed within the modular rack unit instead of relying on the inner wall of the passenger compartment as one of the walls to the air channel. In this way a continuous smooth flow of air along the channel can be maintained. In addition, to assist air flow, the air outlet compartment 6 is reduced in size, whilst still retaining fluid communication with the air channel, and is no longer secured by the side wall 7 to the inner shell 9. Instead, to provide the necessary strength and rigidity to the rack unit, the lighting duct 21 is shaped to be generally rectangular in shape and is secured at its inner wall to the storage shelf 9. The lighting duct 21 ideally has a co-operating rectangular metal extension, for example aluminium, 21a that fits within the lighting duct 21. A snap-in lens cover 22 may be provided to close off the lighting duct 21 over the lighting fixtures within. It should be noted that the ventilation outlet 6 may also include reading lights and call buttons, etc. where necessary.

Thus, it may be seen that the rack unit 1 can be fitted easily to a passenger compartment by only one person and similarly disassembled, when necessary, for maintenance. As the rack unit is modular, it affords the strength and rigidity necessary to contain luggage whilst remaining light enough in weight to enable easy handling. Moreover, fitting the rack unit is simplified as accurate positioning of the rack unit is ensured by means of the longitudinally extending duct support 19 in combination with the longitudinally extending angle bracket 18. This in turn means that the rack unit can be fitted more quickly in comparison to conventional rack units. Additionally, compared to conventional rack units the number of individual parts and fixings is significantly reduced and much of the lighting fixtures can be fitted prior to the installation of the rack unit in the vehicle.

What is claimed is:

1. A rack unit for use in a passenger compartment comprising an outer shell; an inner shell connected to the outer shell and providing a shelf surface; one or more pillars for supporting the inner and outer shells; a duct support defining a longitudinally extending inwardly directed slot; and a longitudinally extending bracket spaced apart from the duct support, whereby the inner and outer shells define a longitudinally extending air duct a portion of which is defined beneath the shelf surface that is sealed by means of engagement between an edge of the inner shell and the duct support and engagement between an edge of the outer shell and the bracket.

2. A rack unit as claimed in claim 1, wherein the duct support is adapted for securement to the ceiling of the passenger compartment with the longitudinally extending inwardly directed slot aligned substantially parallel to the ceiling.

3. A rack unit as claimed in claim 1, wherein the longitudinally extending bracket is adapted for securement to a wall of the passenger compartment with an arm of the bracket projecting substantially perpendicular to the wall.

4. A rack as claimed in claim 1, wherein the engagement of the inner shell and the duct support and the engagement of the outer shell and the bracket define labyrinthine passages for the escape of air from the air duct.

5. A rack unit as claimed in claim 1, wherein at least one of the duct support and the bracket includes a sealing member.

6. A rack unit as claimed in claim 1, further including a lighting duct, distant from the edges of the inner and outer shells for engagement with the passenger compartment.

7. A rack unit as claimed in claim 6, wherein the outer shell includes a light transmissive portion adjacent the lighting duct.

8. A rack unit as claimed in claim 1, further including an air outlet compartment in fluid communication with the air duct.

9. A rack unit as claimed in claim 8, wherein the air outlet compartment is a rectangular channel formed in the outer shell and supporting the inner shell, the rectangular channel having a perforated wall communicating with the air duct.

10. A rack unit as claimed in claim 1, wherein the shelf surface includes a plurality of ridges for restraining movement of articles stored on the shelf surface.

11. A rack unit as claimed in claim 1, wherein side edges of the rack unit are shaped for substantially airtight interconnection with further rack units.

* * * * *